United States Patent [19]
Kulesza

[11] 3,769,143
[45] Oct. 30, 1973

[54] RESIN IMPREGNATED CELLULOSIC VENEER AND LAMINATED PANELS

[75] Inventor: Chester P. Kulesza, Suffern, N.Y.

[73] Assignee: International Paper Company, New York, N.Y.

[22] Filed: Sept. 8, 1971

[21] Appl. No.: 178,701

[52] U.S. Cl............... 161/156, 117/155, 156/154, 156/297, 161/56, 161/170, 161/263, 161/413
[51] Int. Cl...................... B32b 23/02, B32b 31/00
[58] Field of Search.................... 161/156, 170, 36, 161/37, 39, 41, 56, 263, 264, 413; 117/155 L; 156/154, 297, 277

[56] References Cited
UNITED STATES PATENTS
2,557,299  6/1951  Lehr et al. ................... 117/155 X
3,427,284  2/1969  Bright et al. ..................... 161/263

Primary Examiner—William A. Powell
Attorney—Louis F. Reed

[57] ABSTRACT

Cellulosic sheets are impregnated with resin modified cross-linkable urea-formaledehyde resins to provide veneers for furniture and wall panels which are sandable and printable. The resin modified urea-formaldehyde resin constitutes 20 to 75 percent by weight of the cellulosic or paper veneer. The resin modifiers are cross-linking vinyl and acrylic copolymers having chain-pendant methylol groups. Laminates are produced using the veneers of the invention.

25 Claims, 2 Drawing Figures

RESIN IMPREGNATED CELLULOSIC VENEER AND LAMINATED PANELS

BACKGROUND OF THE INVENTION

This invention relates to improved resin impregnated sheet materials which are particularly useful as functional and/or decorative overlays for forest products and to the several aspects thereof including the method of treating the sheet material and the improved forest products overlayed with the improved resin impregnated sheet material.

Forest products, such as plywood, particle board, platen board, hardboard and the like are widely used in paneling, cabinetwork and applications where the surface is exposed. However, the surfaces of such products are generally unsatisfactory because of surface blemishes, chips, knot holes, irregular grains, checking, scuffing, marring, denting, etc. It is generally known that such surfaces can be improved through the lamination thereto of high quality wood veneers, such as those of mahogany, walnut, etc., but the cost is high and the supply of these woods is now extremely limited. Resin-containing papers have been proposed for the purpose. Although the prior art teachings have purported to achieve improved laminations of resin-containing paper, the resulting veneers themselves are generally rigid and break and tear easily during handling and impart only very limited wear and abrasion resistance when laminated onto a wood substrate.

In particular, the wood working industry and especially the furniture manufacturers have desired and requested the development of a satisfactory substitute for wood veneers. The synthetic or substitute veneer must be compatible with wood adhesive systems and manufacturing procedures now used with wood. These veneers are adhesively bonded to a variety of low cost core materials such as lumber, plywood veneers, and extruded or platen chipwood boards to form furniture panels. The bonded panels are then sanded and printed a wood grain pattern. The printed panels are then fabricated and finished into furniture by precisely the same manufacturing method as used in solid wood or wood veneered panels.

It is desirable that the veneer sheet material resist checking, crazing, or swelling. The veneer material should have improved machining characteristics so that it is amenable to sawing, sanding, etc. It should have a harder and more chemically resistant surface than that provided by natural wood veneers. Moreover, the esthetic properties of the veneer should be equal to or superior to those of natural wood in appearance, texture and feel. Previously proposed resin impregnated papers have not supplied these characteristics.

BRIEF SUMMARY OF THE INVENTION

This invention is directed to veneers or overlays of cellulosic sheet material impregnated with a resin modified urea formaldehyde thermosetting resin and to laminates produced from said veneers or overlays.

The modifying resins are vinylic copolymers having chain-pendant methylol groups which are capable of reacting with the amine or methylol groups of the urea-formaldehyde condensation polymer.

It is an object of the invention to provide a cellulosic sheet material which is resin impregnated, which sheet material is sandable or printable as a replacement for natural wood veneers.

It is a further object that the sheet product provide a veneer which shall have good internal fiber bond, have a greater hardness and lesser brittleness than wood veneers and which is compatible with current manufacturing practices used in the furniture, building, and other woodworking industries.

It is an additional object of the invention to provide a cellulosic fiber mat with a resin modified thermosetting ureaformaldehyde resin which has reached the B-stage and which shall be compatible with the urea-formaldehyde adhesives used in producing laminates in the furniture industry. The resin impregnated cellulosic fiber mat is capable of being completely cured at the time that the veneer is bonded to the substrate in a hot platen press at a temperature of 300° F., 150 pounds per square inch pressure for 90 seconds, or temperatures, pressures or times ordinarily used for wood veneers.

It is another important object of the invention to provide a resin impregnated veneer or overlay which is amenable to staining, sanding, calendering, etc., which is harder, ages well and is more chemically resistant than natural wood veneers and whose esthetic properties are equivalent to or superior to natural wood in appearance, texture, feel, etc.

Other objects will be apparent to those skilled in the art from the present description and the appended drawings.

DETAILED DESCRIPTION OF THE INVENTION

Figure 1:
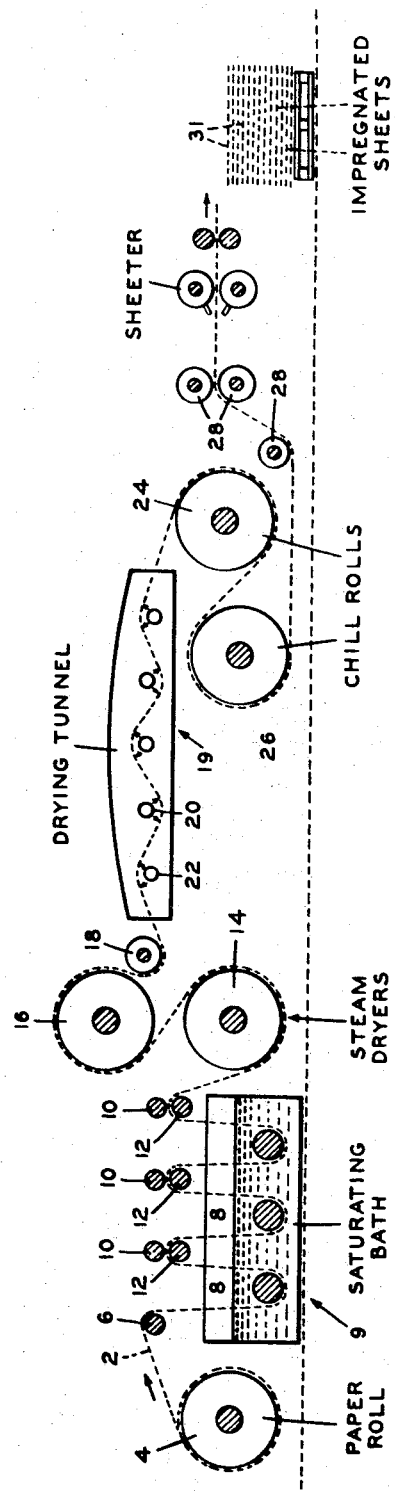
FIG. 1. It is a schematic representation of the method and apparatus for treating and drying the veneer sheeting material.

The advantages of the present invention result from impregnating a fiber matrix or paper sheet which is to provide the veneer with a resin modified cross-linked urea-formaldehyde resin, whereby the cross-linking is accomplished by employing a modifying resin comprising an addition polymer of an ethylenically unsaturated monomer or monomers having chain-pendant methylol groups, preferably about 0.5 to 10 methylol groups per 100 monomeric units in the addition polymer. Alternatively, monomers which in the presence of formaldehyde form methylol groups, may be employed as cross-linking component. Desirably, the matrix or paper is impregnated with 25 to 75 percent by weight of the resin modified cross-linked urea-formaldehyde resin, with the modifying cross-linkable polymer comprising from about 10 to 50 percent, preferably 20 to 30 percent, by weight of the urea-formaldehyde resin, on a dry basis.

The preferred modifying cross-linking polymers are vinyl or acrylic polymers having chain-pendant methylol or methylol forming groups having from one to eight methylol or methylolforming groups per 100 monomeric units in the polymer. Among the preferred modifying cross-linking resins are vinyl copolymers containing up to about 50 parts by weight of alkyl acrylates, wherein the alkyl group contains from two to six carbon atoms, and up to about 12 parts by weight of methylol introducing monomers such as methylol acrylamide. The preferred modifying cross-linking resins are the vinyl-acrylic copolymers containing chain-pendant methylol acrylamide groups.

The presence of the modifying cross-linking copolymers imparts to the impregnated paper sheet significantly superior properties over sheets which are impregnated with unmodified ureaformaldehyde resin. I have discovered that as modified in accordance with the present invention the modifying cross-linking polymers permit one to achieve the advantages of the invention whereas the use of unmodified urea-formaldehyde resins does not.

Thus the modified resins of the invention impart more wood-like properties to the paper. Whereas unmodified ureaformaldehyde produces glass-like or brittle paper sheeting, the modified resins produce more flexible sheets which are not as brittle, which are more receptive to ink and stain and which tend to retain the urea-formaldehyde in the B-stage longer and to retain this state until final lamination, when the C-stage is reached.

The chain-pendant methylol groups, and especially the chain-pendant methylolacrylamide groups, are believed to condense with the amine or methylol groups of the urea-formaldehyde resin, thereby supplying a cross-linking mechanism. It is further believed that the methylol groups may react in some fashion with the hydroxyl groups of the cellulose in the paper to provide bonding of the modified urea-formaldehyde resin to the cellulose and thereby contribute to the unique results which are achieved.

Among the ethylenically unsaturated monomers which may be employed as modifiers are the vinyl monomers, such as vinyl acetate or chloride. Styrene may be employed. Olefins, such as ethylene or propylene, may be employed. Among the acrylics in the modifiers are ethyl, methyl, butyl or hexyl acrylates or methacrylates. Acrylonitrile may be employed. An acrylamide which may be employed is the N-methylolacrylamide or ordinary acrylamide which will react with formaldehyde to produce, in situ, N-methylolacrylamide. Indeed, it is not necessary to employ per se a chain-pendant methylol group containing monomer, but instead, a compound which will react with the excess formaldehyde present in the urea-formaldehyde resin to produce in situ the corresponding chain-pendant methylol containing monomer.

Among the cross-linking modifying resins which may be employed are the following:

Paisley 6858 — a vinyl acetate-acrylic acid copolymer having reactive methylolacrylamide groups — also Paisley NC-700, 5547 and 9052.

Paisley 5675 — a vinyl acetate copolymer having reactive methylolacrylamide groups.

Rohm & Haas Rhoplex HA-16, HA-8 and HA-12 — polyacrylic esters with reactive methylolacrylamide groups.

Jersey Chemicals Crilitex H-50, G-3 and 642 — vinyl acetate acrylic copolymers with methylolamide groups.

Monsanto Inc. Monsat 1400 — a terpolymer of 75 percent vinyl chloride, ethylene and a small amount of methylolacrylamide.

Desirably the urea-formalydehyde resin employed shall contain 1.3 to 2.2 mols of formaldehyde per mol of urea, on a dry solid basis.

An acid catalyst, such as ammonium chloride, zinc chloride, hydrochloric acid, etc. is desirable.

An aqueous bath which contains from 25 to 50 percent, preferably 30 to 40 percent, by weight of solids, of the urea-formaldehyde resin and the cross-linking modifying resin is employed to impregnate the veneer paper with the cross-linking modifying resin comprising from about 10 to 50 percent by weight of urea-formaldehyde on a dry basis. The pH of the bath is desirably adjusted to between about 6.5 to 9, preferably, from 7 to 8. The bath is desirably maintained at a temperature of between about 110° and 160° F. with the viscosity desirably less than about 30 centipoises at 150° F.

Among the papers which may be impregnated to provide the veneers in accordance with the invention are those which are between about 0.01 and 0.05 inches thick made from bleached or semi-bleached chemical pulp paper. The paper is impregnated until it contains between about 25 and 75 percent by weight of resins in accordance with the invention.

To produce a veneer sheeting material of the invention, reference is made to FIG. 1 wherein a cellulosic sheet, such as heavy gauge paper 2, is taken from a continuous parent roll 4. It is fed over a positioning roller 6 so as to change its direction of motion to a substantially vertical position. The paper sheet 2 is then immersed in a saturating bath of impregnating resin described hereinabove. The paper sheet 2 is preferably passed through a series of pressure rolls 10, 12 intermediate to its being immersed in the impregnating formulation. The heavy gauge bleached or semibleached chemical pulp paper 2 desirably may have the following range of characteristics prior to impregnation:

Caliper —0.01 to 0.050 inches
Apparent Density—2.5 to 3.5 lbs. per 1,000 sq. ft. per 0.001 inch of thickness
Basis Weight—42 – 155 lbs. per 1,000 sq. ft.
Finish—Machine finish, comparable on both sides
Gurley Densometer (Porosity)—Less than 25 sec. per 100 ml. of air
Canadian Standard Freeness—550 to 750 CFS units
pH (Wire Pit)—6.0 to 10.0
Wet Strength—10 percent to 25 percent of dry tensile strength
Moisture Content—6 percent to 15 percent
Fiber Composition of Paper—Cellulosic Standard Canadian Freeness, referred to above, is a test made on the pulp which will ultimately be formed into the base sheet. The test is well known in the paper-making industry. It is a measure of the rate at which water drains from a stock suspension on a wire mesh screen or perforated plate. It is measured in standard units of freeness.

In a preferred embodiment of the apparatus for manufacturing the veneer sheet material there is shown a saturating bath 9, having a plurality of submersion rollers 8, intermediate the squeezing rollers 10, 12. The excess resin which is picked up in the saturating bath should be eliminated from the surface and forced into the inter-fiber matrix of the impregnated paper sheet 2.

From the saturating bath 9, the paper sheet 2 passes around a set of steam dryers 14, 16 to eliminate some of the water solvent prior to the final drying steps. It then passes under a placing roller 18 which places the sheet at the same level as the drying tunnel generally labeled 19. The impregnated paper sheet assumes a snake-like orientation between upper 20 and lower 22 drying ports. Air at a temperature of between about 250° and 600° F. is passed through the drier to impart a temperature of between about 212° and 375° F. to the paper. The completion of polymerization of the impregnated resin takes place during the final laminate manufacturing step.

The paper sheet 2 exits from the drying tunnel 19 and is passed over a set of chill rollers 24, 26 so as to cool down the sheet. A roller combination sets up the impregnated paper and feeds it to a sheeter, where it is cut into sheets of the appropriate length, or merely coiled in a roll form. The resultant is a veneer sheet impregnated with modified urea-formaldehyde resin in a B-cured state. It desirably has the following general specifications:

Caliper—0.01 to 0.05 in.
Apparent Density—2.75 – 4.30 lbs. per 1,000 sq. ft. per 0.001 in.
Basis Weight—55 – 210 lbs. per 1,000 sq. ft.
Resin pick-up—25 percent to 75 percent
Moisture Content—4 percent to 15 percent
Gurley Densometer (Porosity)—Less than 25 sec. per 100 ml. of air Prior or subsequent to cutting into sheets of appropriate length the paper sheets may optionally be calendered, sanded, printed, embossed, treated with a size to impart a glaze, stained and lacquered. These steps will impact desired smoothness and physical appearance of the sheet as desired, particularly to simulate the appearance and feel of natural wood.

Figure 2:
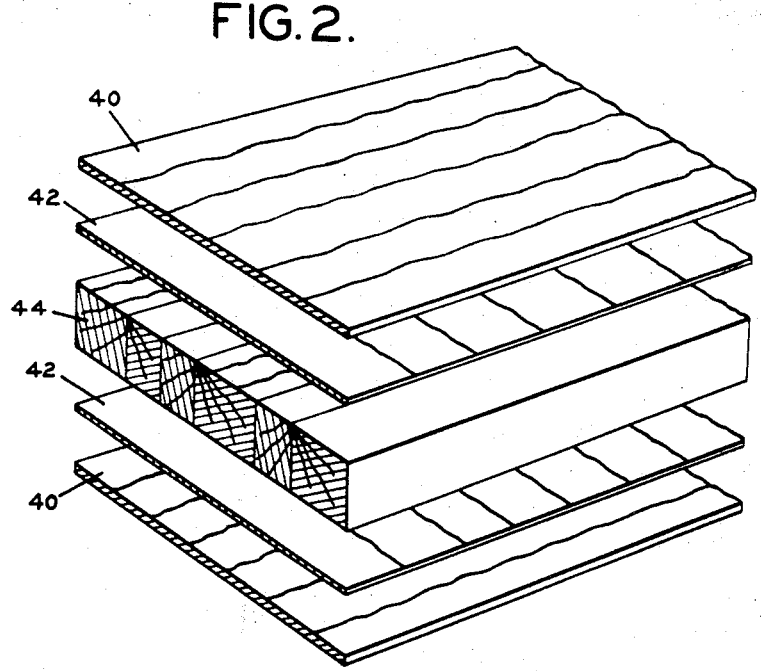
FIG. 2. It is an exploded cross-sectional view of a laminate structure employing the veneer sheeting of the invention.

FIG. 2 is an enlarged exploded cross-sectional view of the laminate structure. The upper layer or veneer 40 is a veneer sheet material of the invention simulating wood sheeting such as walnut, pecan, mahogany, and other woods as may be desirable. Cross-band 42, which may be of natural wood sheeting or resin impregnated, urea-formaldehyde and catalyst coated paper, such as that in accordance with Boggs copending, commonly assigned, U.S. application, Ser. No. 884,454, filed Nov. 24, 1969, now U.S. Pat. No. 3,677,868 is placed between veneer 40 and core 44. Alternatively, the cross-band 42 may be dispensed with entirely. Any urea-formaldehyde or other adhesive customarily used in the industry may be applied between the layers of the laminate. The core stock 44 is made of strips of wood. It should be noted that the core stock grain normally runs in the same direction as the facing veneers grain. This stack is placed in a press along with a number of other stacks at a pressure of between about 75-300 psi at from about 250° to 350° F. temperature for a time interval of 45 seconds to 5 minutes. After the laminate is removed from the press, the modified urea-formaldehyde resin impregnated in the veneer 40 continues to cure on standing until it reaches its finally cured or maximum cross-linked state. This is due in part to the fact that the laminate does not cool for some time after the lamination has been completed, and the retention of heat induces further curing.

The resulting laminate has all the appearances and the desirable properties of wood suitable for use in a furniture factory. The veneer facing of the invention provides a product of superior aging qualities, hardness and abrasion resistance. The wood veneer holds its finish very well during all sorts of usages.

In order to disclose more clearly the nature of the present invention, the following examples illustrating the invention are given. It should be understood, however, that this is done solely by way of example and is intended neither to delineate the scope of the invention nor limit the ambit of the appended claims. In the examples which follow, and throughout the specification, the quantities of material are expressed in terms of parts by weight, unless otherwise specified.

Example 1

A resin impregnating solution, containing about 37.5 percent resin solids, having the following composition was prepared:

| Material | Parts by Weight |
|---|---|
| Urea-formaldehyde resin (Gulf L-100, of Gulf Oil Co., having a formaldehyde to urea ration, on a mol basis, of 2 to 1) | 4000 |
| Water | 3180 |
| Paisley 6858 | 500 |
| Paisley 5675 | 1000 |
| Ammonium hydroxide | 200 |
| Ammonium chloride | 6 |
| Tributyl phosphate | 10 |
| Pontamine CS Yellow dye | 0.9 |
| Crocine Scarlet dye | 0.1 |

The foregoing composition was produced by mixing the urea-formaldehyde resin and the water in a mixing tank and heating to 120° F., while agitating. Next, the ammonium hydroxide was added, followed by the Paisley 6858 and the Paisley 5675. After all had been dispersed, the tributyl phosphate was added. The two dyes were dissolved in a small amount of water and added to the solution. The ammonium chloride was dissolved in a small amount of water and added to the solution. The resulting composition was heated with steam to 155°–160° F.

In the foregoing composition, the Paisley 6858 is a vinyl-acrylic copolymer and the Paisley 5675 is a copolymer of vinyl acetate, both containing chain-pendant methylol acrylamide groups. The methylol groups react with the methylol groups of the urea-formaldehyde to provide cross-linking of the latter. These products are produced by Standard Brands Chemical Industries Inc.

The foregoing impregnating solution was used to impregnate bleached paperboard having a bone dry weight of 85 pounds per 1,000 square feet having a thickness of 0.030 inches. After being dried at about 250° F. in the drying tunnel 19, the paperboard was found to have picked up dry resin in the amount of 56 pounds per thousands square feet of paperboard equivalent to a 40 percent by weight pickup. The paperboard was then cut into sheets.

A laminate, as shown in FIG. 2, was prepared from the foregoing resin-impregnated paperboard, with the paperboard providing the facing or veneer 40, with a cross-band 42 and a core stock 44 made of strips of low cost wood, particle board, platen board or ordinary lumber. The layers had applied between them an adhesive of the typical formula for 100 parts of urea-formaldehyde:

to 40 parts shell flour
to 1.5 parts ammonium hydroxide
to 2 parts ammonium chloride The adhesive formulation should have the viscosity adjusted by the proper addition of water. The laminate is then pressed together with the application of 150 psi pressure and heated to raise the temperature to 250° F. to cure the adhesive and the resin added to the facing layer during the impregnation step. The laminated veneer is then sanded to render it smooth, then printed and embossed to impart a grain structure to the sheet simulating natural wood graining, sized, stained and lacquered to provide an appearance fully simulating that of high grade natural wood.

The resulting laminate had all the appearances of wood suitable for use in a furniture factory. The veneer facing of the invention provided a product of superior aging qualities, hardness and abrasion resistance. The new veneer held its finish very well during usage.

Example 2

A resin impregnating solution, containing about 29% resin solids, having the following composition was prepared:

| Material | Parts by Weight |
|---|---|
| Urea-formaldehyde resin (Gulf L-100, of Gulf Oil Co.) | 600 |
| Alcohol | 296 |
| Water | 450 |
| Acrylic emulsion — Rohm and Haas Rhoplex HA-16 — (an acrylic copolymer latex having chain-pendant methylolacrylamide linkage) | 200 |
| Ammonium hydroxide | 30 |
| Titanium dioxide pigment | 30 |
| Tributyl phosphate | 1 |
| Pontamine CS Yellow dye | 0.1 |
| Ammonium chloride catalyst | 1 |

The foregoing composition was produced by mixing the urea-formaldehyde resin and the water and alcohol in a mixing tank and heating to 120° F., while agitating. Next, the ammonium hydroxide and titanium dioxide were added, followed by Rhoplex HA-16. The tributyl phosphate was then added. The dye was dissolved in a small amount of water and added to the solution. The composition was heated with steam to 155°–160° F.

The foregoing impregnating solution was used to impregnate bleached paperboard having a bone dry weight of 90 pounds per 1,000 square feet having a thickness of 0.030 inches. After being dried at 250° F. in the drying tunnel 19, the paperboard was found to have picked up dry resin in the amount of 46 pounds per thousands square feet of paperboard.

The resin impregnated paperboard was cut into sheets, laminated in accordance with the procedure set forth in Example 1 and sanded, printed and embossed as in Example 1. Example 3

A resin impregnating solution having the following composition was prepared:

| Material | Parts by Weight |
|---|---|
| Urea-formaldehyde resin (Gulf L-100, of Gulf Oil Co.) | 300 |
| Water | 194 |
| Isopropyl alcohol | 148 |
| Crilitex H-50 (of Jersey Chemicals, a vinyl copolymer having chain-pendant methylolacrylamide groups) | 100 |
| Titanium dioxide | 5 |
| 10% solution of DAPP (dimethyl acid pyrophosphate) | 1 |

The foregoing composition was produced by mixing the urea-formaldehyde resin and the water and isopropyl alcohol in a mixing tank and heating to 120° F., while agitating. Next, the Crilitex H-50, titanium dioxide and DAPP were added. The pH, which was orginally 4.5, was adjusted with ammonium hydroxide to 7.5. The composition was heated with steam to 155°–160° F.

The foregoing impregnating solution was used to impregnate bleached paperboard having a bone dry weight of 90 pounds per 1,000 square feet having a caliper thickness of 0.030 inches. After being dried at 250° F. in the drying tunnel 19, the paperboard was found to have picked up dry resin in the amount of 56 pounds per thousand square feet of paperboard equivalent to a 40 percent by weight pickup.

The resin impregnated paperboard was laminated in accordance with the procedure of Example 1 and then sanded, printed and embossed as in Example 1.

Example 4

The procedure of Example 3 was repeated except that the Crilitex H-50 was replaced with an equal amount of Rohm and Haas's Rhoplex AC-201. Rhoplex AC-201 is an acrylic copolymer having chain-pendant methylolacrylamide groups.

Excellent results, similar to those obtained in EXample 3, were obtained.

Example 5

A resin impregnating solution was produced by mixing 4,000 parts by weight of urea-formaldehyde resin (Gulf L-100), 1500 parts by weight of Monsat 1400 (a terpolymer of vinyl chloride, ethylene and metholacrylamide, containing 75 percent by weight of vinyl chloride, manufactured by Monsanto Company), 0.6 parts by weight of ammonium chloride and sufficient water to dilute the composition to provide a solids content of 37.5 percent. The pH was adjusted to 7.5 with ammonium hydroxide.

The foregoing composition was employed to impregnate paperboard as in Example 1, laminated in accordance with the procedure set forth in Example 1, and thereafter sanded, printed and embossed, etc. as in Example 1. The resulting product gave excellent results, similar to those obtained in Example 1.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A veneer sheeting having simulated wood-like properties comprising a fibrous mat impregnated with a partially cured resin-modified, cross-linked urea-formaldehyde resin, wherein the modifying resin is a chain-pendant methylol group containing polymer of an ethylenically unsaturated monomer, said urea-formaldehyde resin containing from about 1.3 to 2.2 mols of formaldehyde per mol of urea, said sheeting containing from about 25 to about 75 percent by weight of said resin-modified, cross-linked urea-formaldehyde resin.

2. A veneer sheeting in accordance with claim 1, wherein the ethylenically unsaturated monomer is a vinyl compound.

3. A veneer sheeting in accordance with claim 1, wherein the ethylenically unsaturated monomer is an acrylic compound.

4. A veneer sheeting in accordance with claim 1, wherein the chain-pendant methylol groups are methylolamide groups and are present to the extent of about 0.5 to 10 groups per 100 monomeric units of said ethylenically unsaturated monomer.

5. A veneer sheeting in accordance with claim 1, wherein said modifying resin is present in the amount of about 10 to 50 percent by weight of said urea-formaldehyde resin.

6. A veneer sheeting in accordance with claim 1, wherein said sheeting being between about 0.01 and 0.05 inches thick.

7. A veneer sheeting in accordance with claim 6 wherein the fibrous mat is of chemical pulp paper.

8. A laminated structure having a veneer surface having simulated wood-like properties, comprising a core and at least one said veneer surface comprising a fibrous mat impregnated with a partially cured resin-modified, cross-linked urea-formaldehyde resin, wherein the modifying resin is a chain-pendant methylol group containing polymer of an ethylenically unsaturated monomer, said urea-formaldehyde resin containing from about 1.3 to 2.2 mols of formaldehyde per mol of urea, said sheeting containing from about 25 to about 75 percent by weight of said resin-modified cross-linked urea-formaldehyde resin.

9. A laminated structure in accordance with claim 8, wherein the ethylenically unsaturated monomer is a vinyl compound.

10. A laminated structure in accordance with claim 8, wherein the ehtylenically unsaturated monomer is an acrylic compound.

11. A laminated structure in accordance with claim 8, wherein the chain-pendant methylol groups are methylolamide groups and are present to the extent of about 0.5 to 10 groups per 100 monomeric units of said ethylenically unsaturated monomer.

12. A laminated structure in accordance with claim 8, wherein said modifying resin is present in the amount of about 10 to 50 percent by weight of said urea-formaldehyde resin.

13. A laminated structure in accordance with claim 8, wherein said sheeting being between about 0.01 and 0.05 inches thick.

14. A laminated structure in accordance with claim 13, wherein the fibrous mat is of chemical pulp paper.

15. A method of producing a veneer sheeting having simulated wood-like properties comprising impregnating a fibrous mat with an aqueous bath containing a urea-formaldehyde resin and as a modifying resin, a chain-pendant methylol group containing polymer of an ehtylenically unsaturated monomer, said urea-formaldehyde resin containing from about 1.3 to 2.2 mols of formaldehyde per mol of urea, said bath containing between about 25 and 50 percent by weight of resin solids, having a pH of from about 6.5 to 9.0, and drying said fibrous mat, said sheeting becoming impregnated with from about 25 to about 75 percent by weight of said resin-modified, cross-linked urea-formaldehyde resin.

16. A method in accordance with claim 15 of producing a veneer sheeting, wherein the ethylenically unsaturated monomer is a vinyl compound.

17. A method in accordance with claim 15 of producing veneer sheeting, wherein the ethylenically unsaturated monomer is an acrylic compound.

18. A method in accordance with claim 15 of producing veneer sheeting, wherein the chain pendant methylol groups are methylolamide groups and are present to the extent of about 0.5 to 10 groups per 100 monomeric units of said ethylenically unsaturated monomer.

19. A method in accordance with claim 15 of producing veneer sheeting, wherein said modifying resin is present in the amount of about 10 to 50 percent by weight of said urea-formaldehyde resin.

20. A method in accordance with claim 15 of producing veneer sheeting, wherein said sheeting is between about 0.01 and 0.05 inches thick.

21. A method in accordance with claim 20 of producing a veneer sheeting, wherein the fibrous mat is of chemical pulp paper.

22. A method in accordance with claim 15 of producing a veneer sheeting, wherein the pH of the bath is maintained at between about 7 and 8.

23. A method in accordance with claim 15 of producing a veneer sheeting, wherein the bath contains between about 30 and 40 percent by weight of resin solids.

24. A method in accordance with claim 15 of producing a veneer sheeting, wherein the bath is maintained at a temperature between about 110° and 160° F.

25. A method in accordance with claim 15 of producing a veneer sheeting, wherein the bath has a viscosity of less than about 30 centipoises at 150° F.

* * * * *

PO-1050
(5/69)

UNITED STATES PATENT OFFICE
CERTIFICATE OF CORRECTION

Patent No. 3,769,143　　　　　　　　Dated　Oct. 30, 1973

Inventor(s)　Chester P. Kulesza

It is certified that error appears in the above-identified patent and that said Letters Patent are hereby corrected as shown below:

Col. 6, line 14, "ration" should be "ratio".

Col. 7, line 47, "Example 3" should be on a separate line.

Col. 7, lines 65 and 66, "orginally" should be "originally".

Col. 8, line 19, "EXample" should be "Example".

Col. 9, line 28, (Claim 10) "ehtylenically" should be "ethylenically".

Col. 10, line 3 (Claim 15) "ehtylenically" should be "ethylenically".

Signed and sealed this 16th day of April 1974.

(SEAL)
Attest:

EDWARD M. FLETCHER, JR.
Attesting Officer

C. MARSHALL DANN
Commissioner of Patents